(12) United States Patent
Wu

(10) Patent No.: US 7,467,001 B2
(45) Date of Patent: Dec. 16, 2008

(54) HANDHELD ELECTRONIC DEVICE HAVING A REPLACEABLE GLASS COVER FOR LCD THEREOF

(75) Inventor: Chang-Hsien Wu, Taipei (TW)

(73) Assignee: Inventec Corporation, Taipei (TW)

( * ) Notice: Subject to any disclaimer, the term of this patent is extended or adjusted under 35 U.S.C. 154(b) by 398 days.

(21) Appl. No.: 11/320,661

(22) Filed: Dec. 30, 2005

(65) Prior Publication Data

US 2007/0155436 A1 Jul. 5, 2007

(51) Int. Cl.
*H04M 1/00* (2006.01)

(52) U.S. Cl. .................... 455/575.8; 455/566; 345/169; 361/683; 361/681

(58) Field of Classification Search ................. 455/566, 455/550.1, 575.1, 575.8, 90.1, 90.3; 345/179, 345/184
See application file for complete search history.

(56) References Cited

U.S. PATENT DOCUMENTS

| | | | | |
|---|---|---|---|---|
| 5,347,630 | A * | 9/1994 | Ishizawa et al. ............. | 345/538 |
| 5,598,231 | A * | 1/1997 | Lin ............................. | 351/49 |
| 6,658,271 | B1 * | 12/2003 | Wu ............................. | 455/573 |
| 6,731,913 | B2 * | 5/2004 | Humphreys et al. ......... | 455/90.3 |
| 6,931,265 | B2 * | 8/2005 | Reyes et al. .................. | 455/566 |
| 7,023,430 | B2 * | 4/2006 | Liu et al. ..................... | 345/179 |
| 7,280,100 | B2 * | 10/2007 | Hanson et al. .............. | 345/169 |
| 7,305,248 | B2 * | 12/2007 | Mori ........................ | 455/550.1 |
| 7,369,884 | B2 * | 5/2008 | Park et al. ................. | 455/575.4 |
| 2003/0017856 | A1 * | 1/2003 | Kotchick et al. ............ | 455/566 |
| 2004/0075639 | A1 * | 4/2004 | Lester et al. ................. | 345/156 |
| 2004/0166895 | A1 * | 8/2004 | Koenck et al. ........... | 455/556.1 |
| 2004/0201578 | A1 * | 10/2004 | Sadahiro ..................... | 345/173 |
| 2004/0204204 | A1 * | 10/2004 | Brilliant et al. ........... | 455/575.1 |
| 2005/0009572 | A1 * | 1/2005 | Ahn et al. .................... | 455/566 |
| 2005/0037717 | A1 * | 2/2005 | Oin et al. .................... | 455/90.3 |
| 2005/0090299 | A1 * | 4/2005 | Tsao et al. ................ | 455/575.5 |
| 2005/0130722 | A1 * | 6/2005 | Eriksson et al. .......... | 455/575.8 |
| 2005/0208985 | A1 * | 9/2005 | Park et al. ................ | 455/575.4 |
| 2005/0282597 | A1 * | 12/2005 | Park et al. ................ | 455/575.4 |
| 2006/0079189 | A1 * | 4/2006 | Watanabe et al. .......... | 455/90.3 |
| 2006/0082518 | A1 * | 4/2006 | Ram .......................... | 345/1.1 |
| 2006/0133015 | A1 * | 6/2006 | Lin et al. .................... | 361/681 |
| 2007/0021068 | A1 * | 1/2007 | Dewhurst .................... | 455/42 |
| 2007/0115202 | A1 * | 5/2007 | Kiesenhofer ................ | 345/1.1 |
| 2008/0051164 | A1 * | 2/2008 | Joo et al. .................. | 455/575.4 |

* cited by examiner

*Primary Examiner*—Charles N Appiah
*Assistant Examiner*—Joy K Contee
(74) *Attorney, Agent, or Firm*—Bacon & Thomas, PLLC

(57) ABSTRACT

The present invention is to provide a handheld electronic device having a replaceable glass cover for an LCD thereof. The electronic device includes a phone body including an LCD disposed beneath a top of a front surface thereof, a slot formed on a top edge of the front surface thereof and extended downward in front of the LCD to terminate at a position about flush with bottom of the LCD, and a glass cover adapted to slide from top of the slot to its bottom for covering the LCD. In addition, a toggle switching assembly is provided at one bottom corner of the slot and has two resilient members capable of driving the toggle switching assembly to either retract the glass cover fully into the slot or eject the same a predetermined distance partially from the slot.

6 Claims, 3 Drawing Sheets

HANDHELD ELECTRONIC DEVICE HAVING A REPLACEABLE GLASS COVER FOR LCD THEREOF

FIELD OF THE INVENTION

The present invention relates to handheld electronic devices and more particularly to a handheld electronic device (e.g., mobile phones, PDAs (Personal Digital Assistants), etc.) having a replaceable glass cover for a LCD (liquid crystal display) thereof, enabling the glass cover to be replaced through a slot disposed in front of the LCD when being damaged or worn.

BACKGROUND OF THE INVENTION

The Internet and mobile communications have known a rapid, spectacular development in recent years. Thus, many types of advanced network and communication products are commercially available. Further, they are widely used in our daily life and work. Such trend not only increases the speed and efficiency of information communication but also brings a lot of convenience to our life and work.

The availability of various handheld electronic devices is even faster as electronics industry makes progress significantly in recent several decades. Consumer-oriented electronic devices (e.g., mobile phones, PDAs (Personal Digital Assistants), etc.) are important ones of them. Such electronic devices are characterized in that they are compact, portable, and inexpensive. Moreover, many advanced features are added therein. Thus, such type of consumer-oriented electronic device not only has features available from typical mobile phone or serves as notepad but also has features such as the high speed Internet access, downloading, e-shopping, etc. associated with wireless data communication. As a result, Internet access and mobile communications are made easy and thus for most people they gradually become a part of their daily life and work.

An era of integrating communications and computer has come. The latest type of mobile phone not only has advanced communication features but also has incorporated wireless data transfer and notepad features thereinto. An example of such type of mobile phone is smartphone which incorporates features of typical mobile phone and PDA. The smartphone thus is capable of effecting mobile-based voice communications, doing PIM (personal information management), sending or receiving e-mails, playing video games, watching news, downloading, making a facsimile, or linking intranet. Moreover, the smartphone has an increased degree of touching comfort and improved screen quality. Thus, smartphones have become powerful 3G mobile phones. In this regard, smartphones are gaining popularity rapidly.

Generally speaking, a wide variety of handheld electronic devices designed and produced by many manufacturers of the art are commercially available on the market. LCD of the handheld electronic device is adapted to display information. LCD is an advanced and relatively expensive product due to advanced design and manufacturing process. LCD is subject to scrape, wear, or damage after a period time of use. Thus, a glass cover is typically provided on LCD for protection. This is the only protection means for LCD available from manufacturers of the art.

However, the glass cover as protection means for LCD is also subject to scrape, wear, or damage after a period time of use of a handheld electronic device. Further, the damaged glass cover may detract from external appearance of the handheld electronic device and lower its quality. To the worse, normal information displaying of LCD may be adversely affected. And in turn, it may cause inconvenience in use. User may buy a protective film and adhere same to the LCD. Alternatively, user may buy an enclosure and put same on a handheld electronic device and its LCD. However, such protection may not only cause inconvenience in use but also detract from its external appearance and lower its quality.

Currently, there are only three ways available as solutions when a glass cover for LCD is damaged or scraped. (i) User buys a new handheld electronic device for preserving its appearance. Inevitably, it may bear a great financial burden on user. Also, it may be somewhat a waste. (ii) User returns the damaged glass cover to an authorized dealer for repair. However, manufacturer typically replaces LCD together with electronic device with a new one rather than replaces the damaged glass cover with a new one after receiving the damaged handheld electronic device from the dealer. Thus, its repair cost is relatively high and it may waste precious resources. Further, this not only contradicts the principles of environmental protection but also bears a great financial burden on user. (iii) User may decide to continuously use the handheld electronic device for saving money if there is only a break on glass cover. However, it may adversely affect quality of displayed information. Further, it may cause inconvenience in use. Furthermore, the damaged glass cover may detract from external appearance of the handheld electronic device and lower its quality. The user, however, only can accept the fact without taking further actions.

Uniqueness is the best way for a handheld electronic device manufacturer to win over other competitive ones. Thus, it is desirable to provide an improved glass cover for LCD and the glass cover is replaceable when it is damaged or worn. This glass cover thus has the advantages of saving repair cost, bringing a lot of convenience to users, increasing sales, and contributing greatly to the advancement of the art.

SUMMARY OF THE INVENTION

After considerable research and experimentation, handheld electronic device having a replaceable glass cover for an LCD thereof according to the present invention has been devised. The glass cover thus can be replaced when it is damaged or worn so as to overcome the above drawbacks of the prior art.

It is an object of the present invention to provide an improved glass cover mounted on the LCD of a handheld electronic device. The glass cover may be replaced by a new one in a low cost when it is damaged or worn so as to eliminate and overcome drawbacks experienced by the prior art.

It is another object of the present invention to provide a replaceable glass cover which is adapted to mount on the LCD of a handheld electronic device (e.g., mobile phone). The mobile phone thus may preserve its appearance and its quality is not adversely affected after the replacement. Further, operating convenience is still maintained after the replacement.

To achieve the above and other objects, the present invention provides a handheld electronic device (e.g., mobile phone) comprising a phone body including an LCD disposed beneath a top of a front surface thereof, a slot formed on a top edge of the front surface thereof and extended downward in front of the LCD to terminate at a position about flush with bottom of the LCD, and a glass cover adapted to slide from a top of the slot to its bottom for covering the LCD. In addition, a toggle switching assembly is provided at one bottom corner of the slot. The toggle switching assembly includes two resilient members. The toggle switching assembly and the resilient members are adapted to either retract the glass cover into the slot or eject same a predetermined distance partially from the slot.

The above and other objects, features and advantages of the present invention will become apparent from the following detailed description taken with the accompanying drawings.

DETAILED DESCRIPTION OF THE PREFERRED EMBODIMENTS

Figure 1:
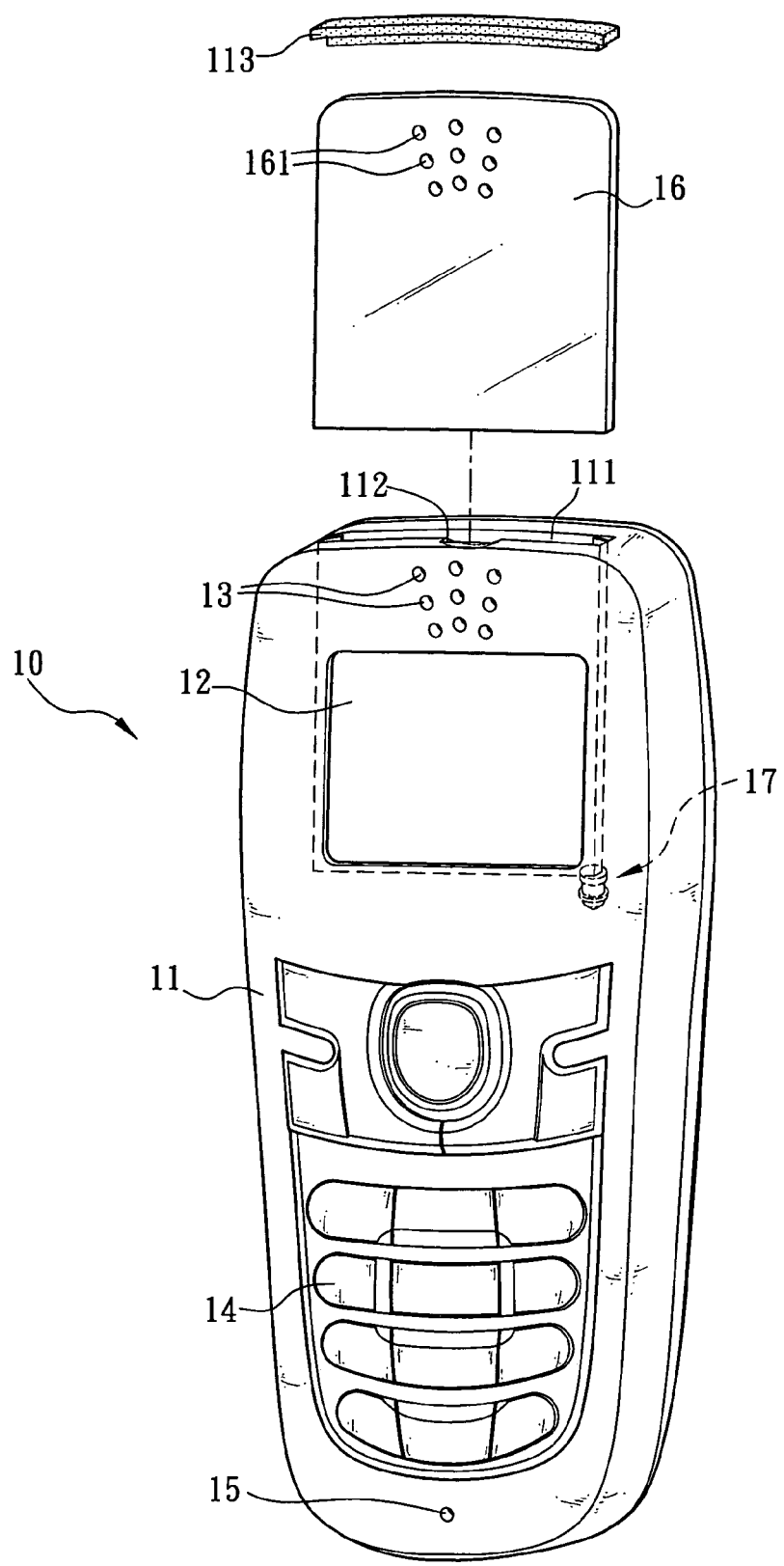
FIG. 1 is an exploded perspective view of a handheld electronic device incorporating a preferred embodiment of replaceable glass cover for its LCD according to the invention.

Referring to FIG. 1, a handheld electronic device incorporating a replaceable glass cover for its LCD in accordance with a preferred embodiment of the invention is shown. The handheld electronic device is implemented as a mobile phone and is designated by numeral 10. The mobile phone 10 comprises a phone body 11 including, on its front surface, an LCD 12, a speaker 13, a keypad 14, and an audio input 15. The LCD 12 is provided beneath a top of the front surface of the phone body 11 and is adapted to display information, including icons, characters, etc. The speaker 13 is provided between the top of the front surface of the phone body 11 and the LCD 12 and is adapted to amplify sound. A plurality of holes are formed on the speaker 13. The keypad 14 is provided proximate the bottom of the front surface of the phone body 11 and is adapted to display digit or letter or input command. The audio input 15 is provided between the bottom of the front surface of the phone body 11 and the keypad 14 and is adapted to receive audio signal input from an external source. At least one hole is formed on the audio input 15. It is well understood by those skilled in the art that locations of the LCD 12, the speaker 13, the keypad 14, and the audio input 15 may be altered or changed without departing from the scope and spirit of the invention.

Referring to FIG. 1, in view of the above configuration implementation of the invention will be described in detailed below. A slot 111 is formed on a top edge of the front surface of the phone body 11 and extended downward in front of the LCD 12 to terminate at a position about flush with bottom of the LCD 12. A glass cover 16 is adapted to slide from top of the slot 111 to its bottom. Finally, the LCD 12 is covered by the glass cover 16.

In the embodiment a toggle switching assembly 17 is provided at one bottom corner of the slot 111. The toggle switching assembly 17 comprises two resilient members 171 (see FIG. 2). The toggle switching assembly 17 and the resilient members 171 are adapted to retract the glass cover 16 in place by means of elasticity after sliding the glass cover 16 from the slot 111 to its bottom. To the contrary, depressing the glass cover 16 again will release stored elastic force of the toggle switching assembly 17 and the resilient members 171 to partially eject the glass cover 16 a predetermined distance from the slot 111 (see FIG. 3). Thereafter, a user may remove the glass cover 16 easily for replacement. It is well understood by those skilled in the art that the toggle switching assembly 17 may be replaced by an equivalent device without departing from the scope and spirit of the invention as long as the device has the same retraction and ejection capabilities.

Referring to FIG. 1 again, in the embodiment the glass cover 16 comprises a plurality of holes 161 which are disposed corresponding to the speaker 13. Thus, sound amplified by the speaker 13 may be heard clearly without being decreased in volume. Further, an oval-shaped indentation 112 is formed on an edge of the slot 111. A user may place the finger in the indentation 112 for removing the glass cover 16 or inserting same in the slot 111 in an easy way.

In the embodiment, a flexible cap 113 is further provided and is adapted to snap on the slot 111 of the phone body 11 for sealing the glass cover 16 inserted into the slot 111.

Figure 2:
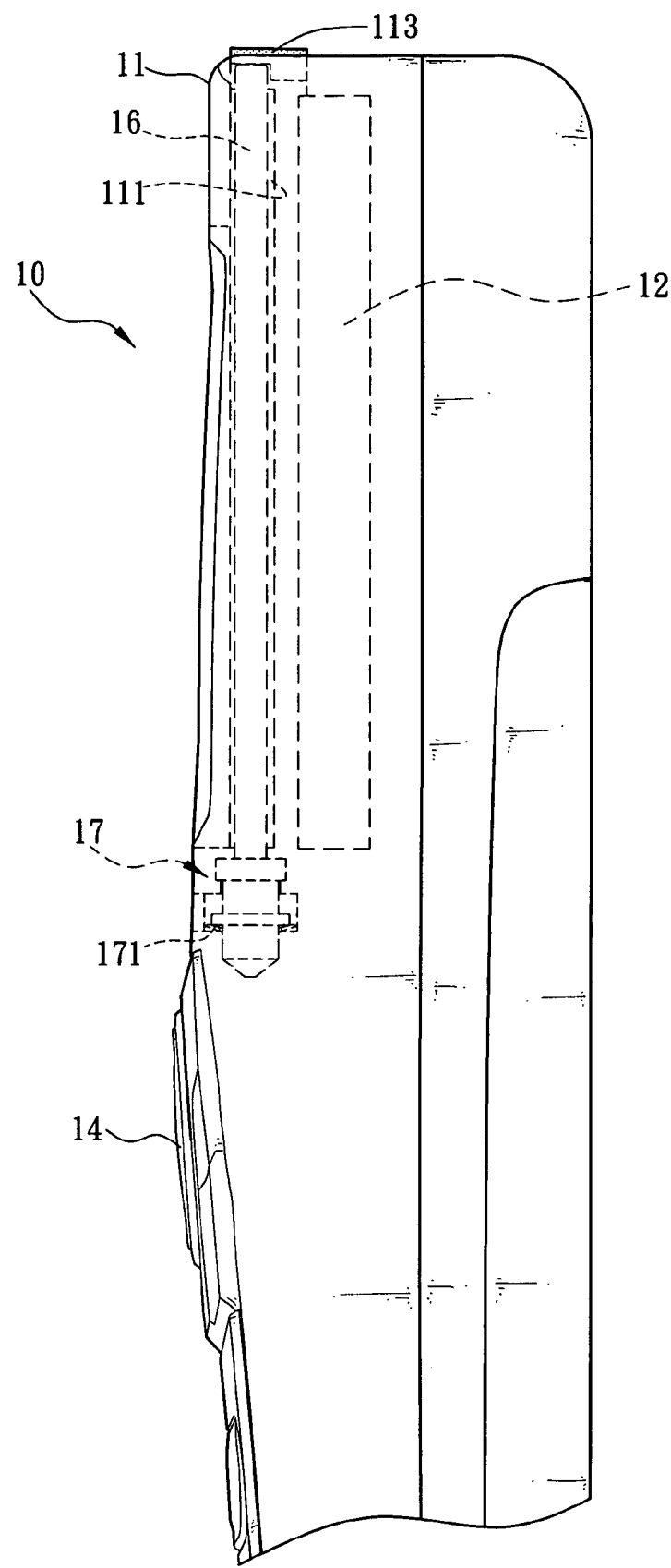
FIG. 2 is a side view of the glass cover retracted in place.
Figure 3:
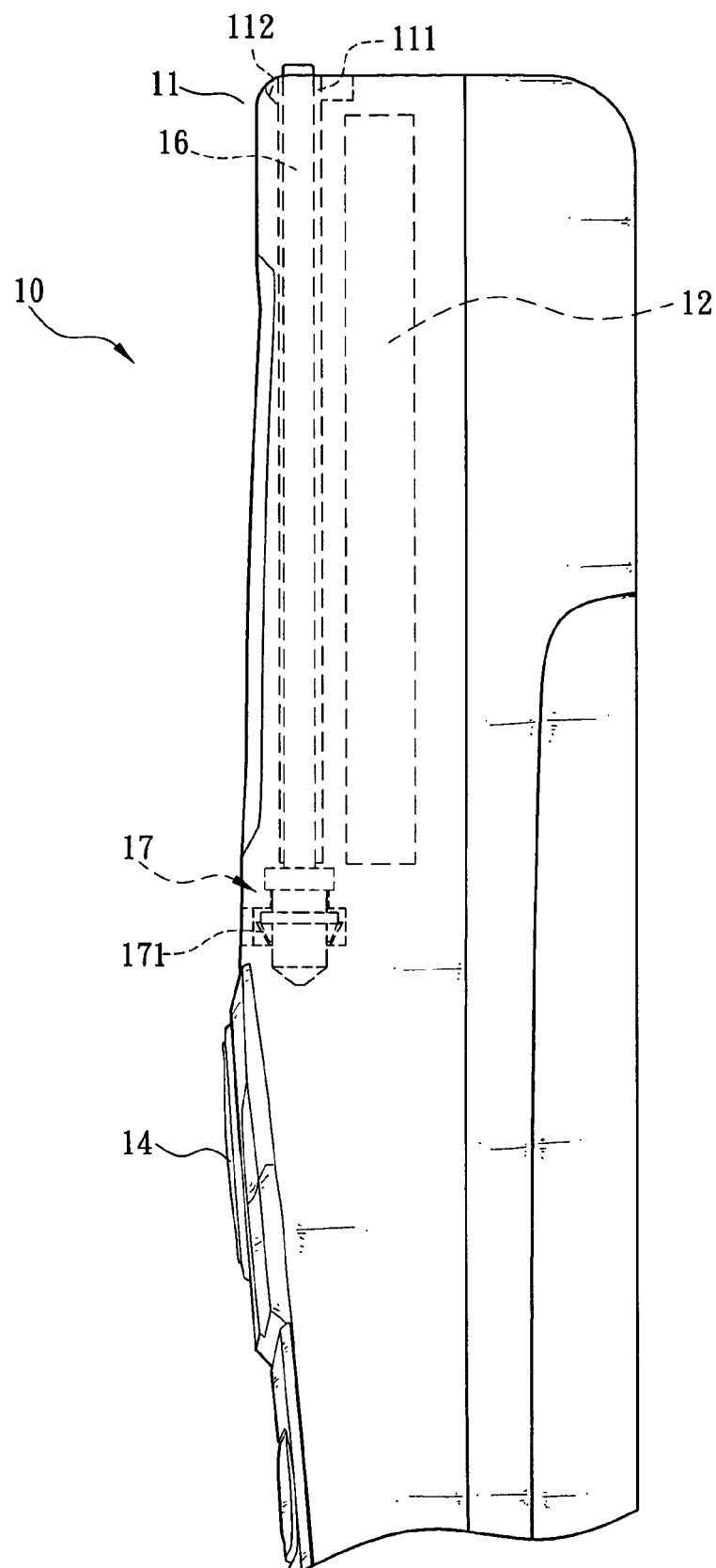
FIG. 3 is a view similar to FIG. 2 where the glass cover is ejected a predetermined distance partially from the slot prior to being removed for replacement.

Referring to FIGS. 1, 2, and 3, from the above description of components it is clear to see how to assemble the glass cover 16 in front of the LCD 12. In detail, the toggle switching assembly 17 and the resilient members 171 are adapted to retract the glass cover 16 in place by means of elasticity after sliding the glass cover 16 from the slot 111 to its bottom. To the contrary, depressing the glass cover 16 again will release stored elastic force of the toggle switching assembly 17 and the resilient members 171 to partially eject the glass cover 16 a predetermined distance from the slot 111. Thereafter, a user may remove the glass cover 16 easily for replacement. The replacement is of low cost and the replaced glass cover 16 is new. As a result, the mobile phone 10 may preserve its appearance and its quality is not adversely affected. Further, operating convenience is still maintained after the replacement.

While the invention herein disclosed has been described by means of specific embodiments, numerous modifications and variations could be made thereto by those skilled in the art without departing from the scope and spirit of the invention set forth in the claims.

What is claimed is:

1. A handheld electronic device comprising:
a phone body including, on a front surface, a liquid crystal display, a speaker, and a keypad, wherein the liquid crystal display is provided beneath a top of the front surface of the phone body, the speaker is provided between the top of the front surface of the phone body and the liquid crystal display, and the keypad is provided proximate a bottom of the front surface of the phone body, which is characterized in that:
a slot is formed on a top edge of the front surface of the phone body and extended downward in front of the liquid crystal display to terminate at a position about flush with a bottom of the liquid crystal display, and a glass cover is adapted to slide from a top of the slot to a bottom thereof for covering the liquid crystal display; and
a toggle switching assembly provided at one bottom corner of the slot and including two resilient members, wherein the toggle switching assembly and the resilient members are adapted to either retract the glass cover into the slot or partially eject the glass cover a predetermined distance from the slot.

2. The handheld electronic device of claim 1, wherein the glass cover includes a plurality of holes disposed corresponding to the speaker.

3. The handheld electronic device of claim 2, further comprising an indentation formed on an edge of the slot.

4. The handheld electronic device of claim 3, further comprising a flexible cap adapted to snap on the slot of the phone body for sealing the slot.

5. The handheld electronic device of claim 2, further comprising an audio input provided between the bottom of the front surface of the phone body and the keypad.

6. The handheld electronic device of claim 2, wherein the phone body is the phone body of a mobile phone.

* * * * *